US012118976B1

(12) United States Patent
Chen et al.

(10) Patent No.: US 12,118,976 B1
(45) Date of Patent: Oct. 15, 2024

(54) COMPUTER-IMPLEMENTED METHOD AND COMPUTER SYSTEM FOR CONFIGURING A PRETRAINED TEXT TO MUSIC AI MODEL AND RELATED METHODS

(71) Applicant: Futureverse IP Limited, Auckland (NZ)

(72) Inventors: Boyu Chen, Adelaide (AU); Peike Li, Sydney (AU); Yao Yao, Shenzhen (CN); Yijun Wang, Auckland (NZ)

(73) Assignee: Futureverse IP Limited, Auckland (NZ)

( * ) Notice: Subject to any disclaimer, the term of this patent is extended or adjusted under 35 U.S.C. 154(b) by 0 days.

(21) Appl. No.: 18/622,365

(22) Filed: Mar. 29, 2024

(51) Int. Cl.
*G10L 13/027* (2013.01)
*G10L 15/00* (2013.01)

(52) U.S. Cl.
CPC .................................. *G10L 13/027* (2013.01)

(58) Field of Classification Search
CPC ......... G10L 13/027; G10L 25/78; G06N 3/08; G06N 3/04; G06N 5/045; G06F 16/432; G06F 40/284; G06F 16/438
See application file for complete search history.

(56) References Cited

U.S. PATENT DOCUMENTS 11,164,109 B2 11/2021 Browne et al.
11,429,762 B2 8/2022 Mallya Kasaragod et al.
11,710,027 B2 7/2023 Zhu et al.
11,836,640 B2 12/2023 Ji et al.
11,853,724 B2 12/2023 Hunter
11,868,896 B2 1/2024 Brown et al.
2018/0357047 A1 12/2018 Brown et al.
2021/0149958 A1 5/2021 Hunter
2021/0357780 A1 11/2021 Ji et al.
2022/0157294 A1* 5/2022 Li ............................ G06N 3/08
2022/0188810 A1 6/2022 Doney
2023/0169080 A1* 6/2023 Iyer ........................ G06N 5/045
707/756
2023/0281601 A9 9/2023 Doney
2023/0350936 A1* 11/2023 Alayrac ................... G06N 3/08
2023/0385085 A1 11/2023 Singh

FOREIGN PATENT DOCUMENTS

CA 3150262 A1 3/2021
WO 2021046541 A1 3/2021
WO 2021097259 A1 5/2021

OTHER PUBLICATIONS

Steinwold, "AI + NFTs: What is an INFT?", Apr. 6, 2021, Available at: https://andrewsteinwold.substack.com/p/ai-nfts-what-is-an-inft-.

* cited by examiner

*Primary Examiner* — Huyen X Vo
(74) *Attorney, Agent, or Firm* — Rimon PC; Marc S. Kaufman

(57) ABSTRACT

The method involves configuring a pretrained text to music AI model that includes a neural network implementing a diffusion model. The process includes receiving audio sample data corresponding to a specific audio concept, generating a concept identifier token based on the audio sample data, adapting a loss function of the diffusion model based on the concept identifier token, selecting pivotal parameters in weight matrices in a self-attention layer of the neural network of the AI model based on the audio sample data, and further training the pivotal parameters of the AI model, to optimize the AI model for the specific audio concept.

18 Claims, 4 Drawing Sheets

COMPUTER-IMPLEMENTED METHOD AND COMPUTER SYSTEM FOR CONFIGURING A PRETRAINED TEXT TO MUSIC AI MODEL AND RELATED METHODS

TECHNICAL FIELD

The disclosure pertains to the field of generative artificial intelligence (AI), specifically to the generation of music using a pretrained AI model and the configuration of such a pretrained AI model.

BACKGROUND

Artificial Intelligence (AI) has been increasingly used in various fields. Generative AI is a subset of AI in which the AI model generates new content, such as tech (e.g., a chatbot, images, or music. AI models for text-to-music generation have recently achieved significant progress, facilitating the high-quality and varied synthesis of musical compositions from provided text prompts. For example, a user could input "create a sad song with a slow methodical tempo", as a prompt, and the AI model will create a song with those characteristics. However, the input text prompts often cannot describe the user requirement exactly, especially when the user wants to generate the music with specific concept (e.g., a specific genre, a specific style, or a specific instrument) from a specific reference collection.

AI models used for music generation often include a diffusion model. Fundamentally, diffusion models work by destroying training data through the successive addition of Gaussian noise, and then learning to recover the data by reversing this noising process. Diffusion models have worked very well for music generation. However, conventional models often struggle to generate music that accurately represents specific audio concepts, such as a genre, the style of a specific artist or the sound of a specific musical instrument. This is because the models are not specifically trained to recognize and reproduce these unique characteristics. Furthermore, the process of training these models can be complex and time-consuming, often requiring the selection and optimization of numerous parameters.

Customized Creation in image generation using diffusion models has become a highly popular area of research. For Example, an image is worth one word: Personalizing Text-to-Image Generation Using Textual Inversion, authored by Rinon Gal, Yuval Alaluf, Yuval Atzmon, Or Patashnik, Amit H Bermano, Gal Chechik, and Daniel Cohen-Or, (referred to as "Gal" herein) teaches that new pseudo-words can be to the vocabulary of a frozen text-to-image model. Dreambooth: Fine tuning Text-to-Image Diffusion Models for Subject-Driven Generation, authored by Nataniel Ruiz, Yuanzhen Li, Varun Jampani, Yael Pritch, Michael Rubinstein, and Kfir Aberman (referred to as "Ruiz" herein) expands on the teaching of Gal by introducing a method to associate unique identifiers with specific subjects. By training the entire U-Net with a class-specific prior preservation loss, Ruiz enables the creation of photorealistic images of subjects in a variety of contexts and poses.

Additionally, Multi-concept Customization of text-to-image Diffusion, authored by Nupur Kumari, Bingliang Zhang, Richard Zhang, Eli Shechtman, and Jun-Yan Zhu (referred to as "kumari" herein). Reaches enhancing training efficiency of a text-to-image model by focusing on training only a portion of the model parameters and utilizing regularization samples from the training dataset. Despite these advances in image generation, the concept of customization has not been explored in music generation field. Therefore, there is a need for improved methods for configuring AI models for customized music generation.

SUMMARY

Proposed implementations leverage a customized music generation task that does not rely solely on specific text descriptions. Instead, the model is capable of generating various music pieces based on reference music data. This approach overcomes the challenges of text description dependency, offering a more flexible and user-friendly solution for customized music generation. In the disclosed implementations, a novel method is used to select "pivotal parameters", i.e., the best parameters for optimization within the text to music model. The disclosed implementations also include a new regularization technique for multi-concept training in order to address specific challenges unique to the task of music generation. Disclosed implementations also include a novel dataset and model evaluation method.

One disclosed implementation is a computer-implemented method is provided for configuring a pretrained text to music artificial intelligence (AI) model that includes a neural network implementing a diffusion model. The method involves receiving audio sample data corresponding to a specific audio concept and generating one more concept identifier tokens based on the audio sample data. The concept identifier tokens represents unique characteristics of the audio sample data. The loss function of the diffusion model is adapted based on the concept identifier token. Pivotal parameters in weight matrices in a self-attention layer of the neural network of the AI model are selected based on the audio sample data. The pivotal parameters of the AI model are further trained, thereby optimizing the AI model for the specific audio concept.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this disclosure, wherein like reference numerals designate corresponding parts in the various figures. It is to be expressly understood, however, that the drawings are for the purpose of illustration and description only and are not intended as a definition of the limits of the claimed invention. As used in the specification and in the claims, the singular form of "a", "an", and "the" include plural referents unless the context clearly dictates otherwise.

BRIEF DESCRIPTION OF THE DRAWING

The invention is described in connection with the attached drawing in which.

DETAILED DESCRIPTION

Figure 1:
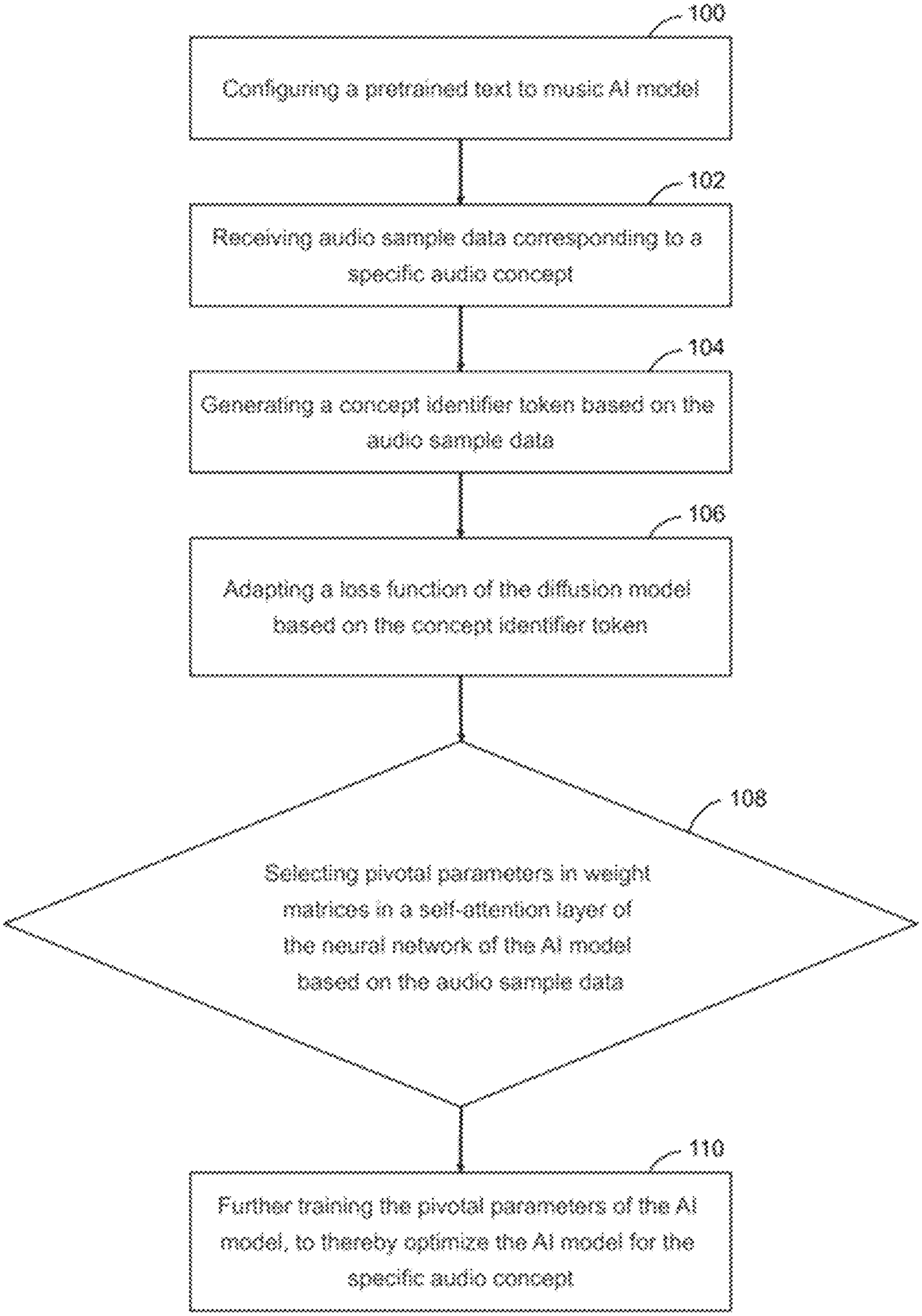
FIG. 1 is a flowchart of a method for optimizing a pretrained AI model for a specific audio concept in accordance with disclosed implementations.

In one example of the disclosed implementations, a JEN-1 model is used as the foundation model that is to be optimized in accordance with disclosed implementations. JEN-1 is a well-known state-of-the-art text-to-music generation model built upon diffusion models. Diffusion models, represent an emerging class of probabilistic generative models designed to approximate complex data distributions. These models operate by transforming simple noise distributions into intricate data representations, a process particularly effective in high-quality sound generation.

A diffusion model is anchored in two primary processes: forward diffusion and reverse diffusion. In the forward diffusion phase, the model incrementally introduces Gaussian noise into the data over a series of steps. Each step in this Markov Chain can be mathematically expressed as $$q(x_t|x_{t-1})=N(x_t;\sqrt{1-\beta_t}x_{t-1},\beta_t \mathbf{I}), \tag{1}$$

where $x_t$ is the data at time step t and $\beta_t$ are predefined noise levels. The reverse diffusion phase involves a gradual denoising of the data. This is achieved through a neural network that learns to reverse the noise addition, a key element in synthesizing realistic audio. The reverse process can be described by the equation $$p_\theta(x_{t-1}|x_t)=N(x_{t-1};\mu_\theta(x_t,t),\sigma_\theta^2(t)\mathbf{I}), \tag{2}$$

where the functions $\mu_\theta$ and $\sigma_\theta^2$ are parameterized by the neural network, enabling the precise prediction of mean and variance at each reverse diffusion step.

The learning mechanism of diffusion models entails a fine balance between the forward diffusion process, which employs a linear Gaussian model to perturb an initial random variable until it aligns with the standard Gaussian distribution, and the reverse denoising process. The latter utilizes a noise prediction model, parameterized by θ, to estimate the conditional expectation $E[\epsilon_t|x_t]$ by minimizing a regression loss. This loss, expressed as $$\min_\theta \mathbb{E}_{t,x,\epsilon}\left[\|\epsilon_t-\epsilon_\theta(x_t,t)\|_2^2\right], \tag{3}$$

guides the model in learning the distribution of the original data from its noisy version. In summary, diffusion models provide a sophisticated framework for generating high-fidelity data, such as audio, by intricately modelling the transition from noise to structured data.

In this example, JEN-1 serves as the foundational model for text-to-music generation, which is built based on the well-known Latent Diffusion Model (LDM). This model adheres to the same forward phase of diffusion models noted above. However, the reverse phase and the loss function are different by incorporating textual condition $y\in R^{s\times d}$ within latent space to control the synthesis process, $$\min_\theta \mathbb{E}_{t,x,\epsilon,y}\left[\|\epsilon_t-\epsilon_\theta(x_t,t,y)\|_2^2\right], \tag{4}$$

where $x_t\in R^{l\times c}$ is the noisy music latent input at timestep t, which is generated from the original music latent $x_0$, $\epsilon_t$ represents to stochastic noise at timestep t, $\epsilon_\theta(.)$ denotes a time-conditional ID.

FIG. 1 illustrates a high-level method of model tuning in accordance with disclosed implementations. At step 100, a text to music AI model, that includes a neural network with a diffusion model, is configured and trained in a conventional manner to set the AI model parameters (which later can be optimized for a specific audio concept). In this example, the neural network can include a generative diffusion model that creates data by reversing a diffusion process, starting with random noise and gradually shaping it into structured output, such as music corresponding to a text prompt.

The following configuration process includes setting up the system to improve performance for generating music in accordance with one or more specific audio concepts. The concept(s) can be, for example, the style of a specified artist, the sound of a specified musical instrument, or a specified genre of music. At step 102, audio sample data, corresponding to the specified concept, is received. Stated differently, the AI model is provided with audio snippets that embody a particular concept. A data processing module of the AI model is programmed to accept and process this data, which is essential for the subsequent steps of the method. The purpose of this process is to supply the AI model with relevant examples of the concept so that it can learn to identify, generate, or manipulate this concept in future tasks.

Of course, the audio sample data must be in, or converted to, a format that is compatible with the AI model, which typically involves digital audio formats. The data should also be of sufficient quality and quantity to accurately represent the concept. The quality and relevance of the audio sample data can impact the effectiveness of the subsequent steps.

At step 104, one or more concept identifier tokens, that encapsulate/indicate the unique characteristics of the audio sample, are generated. At step 106, the model's loss function, which measures how well the AI's output matches the expected result, is adapted based on the concept identifier token(s) in a known manner. Generally a loss function takes the following two parameters: Predicted output (y') Target value (y). The loss function determines This will determine the performance of the model. The loss function determines the error between a model's predictions on test data and actual known target values, thereby indicating how well the model aligns with desired outcomes. "Loss" refers to the penalty incurred when the model fails to meet expectations. The loss function can be used to guide model training, through parameter adjustments, to minimize errors and improve predictive accuracy.

At step 108, "pivotal parameters" within weight layers of matrices of the model's self-attention layers are selected based on the audio sample data (Step 108). The self-attention layer allows the model to focus on different parts of the input sequence, which is necessary for tasks such as sequence modelling and generation. The selection of parameters can be accomplished through the use of a trainable mask, which is multiplied with the parameters of the self-attention layer to derive a refined mask, and selecting parameters with the highest variation between the trainable mask and the refined mask, as described in greater detail below. In step 110, the selected pivotal parameters are further trained to optimize the AI model for the specified audio concept. This optimization increases the effectiveness of the AI model for generating music based on the defined audio concept, thereby enhancing the model's performance and output quality. The pivotal parameters selection and tuning is described in more detail below.

Figure 2:
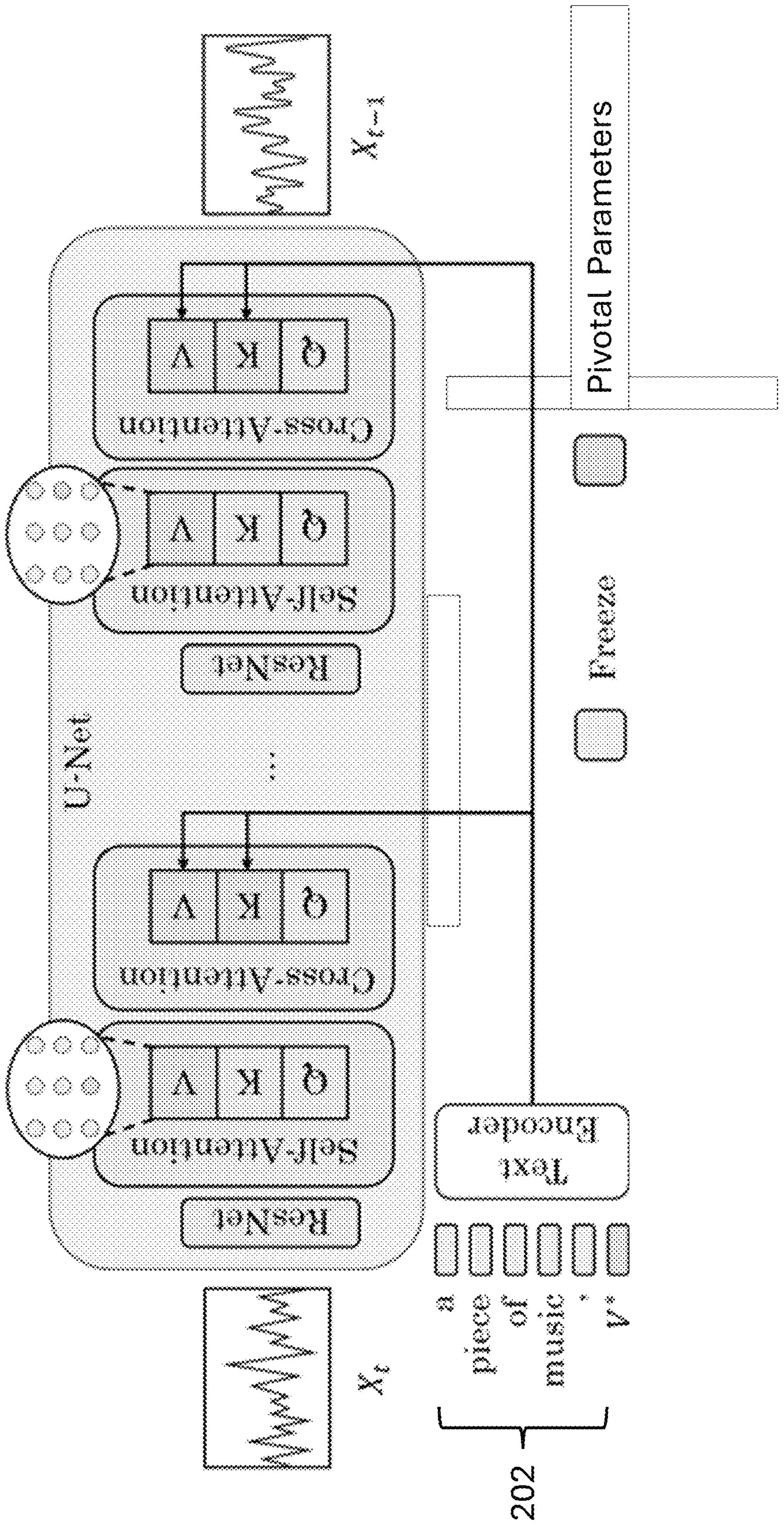
FIG. 2 illustrates a computing architecture of components of a Pretrained Text to Music AI Model Configuration System in accordance with disclosed implementations.

FIG. 2 illustrates computing system architecture and a method of operation thereof in accordance with an example of disclosed implementations. Based on concept data 202 indicating novel musical concepts (e.g., multiple clips of music data), the most relevant (pivotal) parameters, within the self-attention layers and the cross-attention layers of the U-Net module of a text-to-music diffusion model, are selected and adjusted. As noted in the key of FIG. 2, the pivotal parameters are denoted by shading. Also, to enhance discriminative capabilities of the model, one or more trainable concept identifier tokens 204, denoted as V*, are selected/generated to specify these new concepts. During training, these pivotal parameters in the self-attention layers and in the cross-attention layers, are adjusted based on the concept identifier tokens.

Based on the textual input features and latent music features, the textual condition y is then integrated into the U-Net's intermediate layers via a cross-attention mechanism, defined as:

$$\text{Attention}(Q, K, V) = \text{softmax}\left(\frac{QK^T}{\sqrt{d}}\right)\cdot V, \tag{5}$$

where, $$Q = W_Q^{(i)} \cdot f^{(i)},\ K = W_K^{(i)} \cdot y,\ V = W_V^{(i)} \cdot y. \tag{6}$$

The matrices $W_Q^{(i)}$, $W_K^{(i)}$ and $W_V^{(i)}$ denote learnable (pivotal) parameters of the $i_{th}$ cross-attention layer. $f^{(i)} \in R^{l \times C(i)}$ denotes the input music feature of $i_{th}$ cross-attention layer, y is the textual condition, and d is the output dimension of key and query features. The model training involves pairs of latent music conditions and textual conditions $\{(x_0, y)\}$. $\epsilon_\theta(.)$ is optimized by applying Eq. (4). During inference, only the U-Net Ee (.) is used to synthesize the desired music generation based on the textual prompt input by the user.

In cross-attention layers within a text-to-music generation context, $W_K$ and $W_V$ project textual information, while We extracts music features. The attention map, computed from the interaction between music features encoded by $W_Q$ and textual features from $W_K$, is applied as weights to the textual features encoded by $W_V$. The weighted sum of textual features forms the output, enabling an effective integration of musical and textual data. Conversely, in self-attention layers, $W_Q$, $W_K$, and $W_V$ are all employed to encode and process the music features, facilitating internal focus on various segments of the input.

Disclosed implementations are designed for customized text-to-music generation, which aims to produce diverse musical compositions based on concept data, such as two-minutes of music data from a reference piece, without any supplementary textual input to specify the concept. The first challenge for the task is understanding and interpreting unique musical concepts, such as instruments or genres, associated with the reference music.

After the network has captured these musical concepts, the subsequent challenge is to produce a diverse range of music that adheres to these musical concepts. The technical solution to this challenge is addressed in detail below. In disclosed implementations once a new musical concept in integrated into the pretrained text-to-music generation model, any text prompts can be applied to generate the music with the specific concept, such as an instrument, artist style, or genre. The generated music will be consistent with the input text prompts, as well as the learned concept.

However, direct fine-tuning risks "overfitting" (i.e., incorporating too much noise of the training data set in the learning model) to this limited dataset, leading to a loss of the generalization ability of the model (i.e., the ability of the model to provide good results to data that was not in the training set). Regularization techniques are a set of well-known techniques that can prevent overfitting in neural networks. Once regularization technique, known as "Class-specific Prior Preservation Loss", is a method that uses a model's own generated samples to help the model learn how to generate more diverse images. Class-specific Prior Preservation Loss acts as a regularizer that alleviates overfitting, allowing pose variability and appearance diversity in a given context. However, this method requires object class information, which is not readily available in music generation applications. Accordingly, the prior art does not offer an acceptable methodology for model generalization in music generation applications.

Further, Kumari, recognizes the significance of cross-attention layers during the fine-tuning process and teaches training only the cross-attention layers, including $W_K$ and $W_V$ in Eq. (6). Applicants have discovered that training only the cross-attention layers is insufficient to effectively learn new concepts from input reference music data, as discussed in detail below.

To enhance the learning capacity of music generation models, disclosed implementations extend training to include $W_V$ from self-attention layers. Also, as noted above, disclosed implementations include a pivotal parameters selection and tuning technique (described in detail below), which facilitates an effective compromise between integrating new concepts and maintaining existing knowledge, ensuring that the model remains versatile in generating diverse musical compositions while being capable of adapting to new concepts.

To enhance concept extraction, learnable concept identifier tokens, denoted as V*, are utilized to represent the unique characteristics of the reference music. During training or generation, the concept identifier token V* is integrated with the original textual condition y as concat(V*,y). Subsequently, this modification leads to an adaptation of the loss function. The original loss function, as defined in Eq. (4), is reformulated as follows:

$$\min_{V^*} \mathbb{E}_{t,x,\epsilon,V^*}\left[\|\epsilon_t - \epsilon_\theta(x_t, t, concat(V^*, y))\|_2^2\right]\theta, \tag{7}$$

In disclosed implementations, the model parameters e and the concept identifier token V* are trained together. It should be mentioned that more than one token can be used to represent a new concept as described in detail below. For simplicity of description, $V^{*1}$ is used below to represent one concept.

Figure 3:
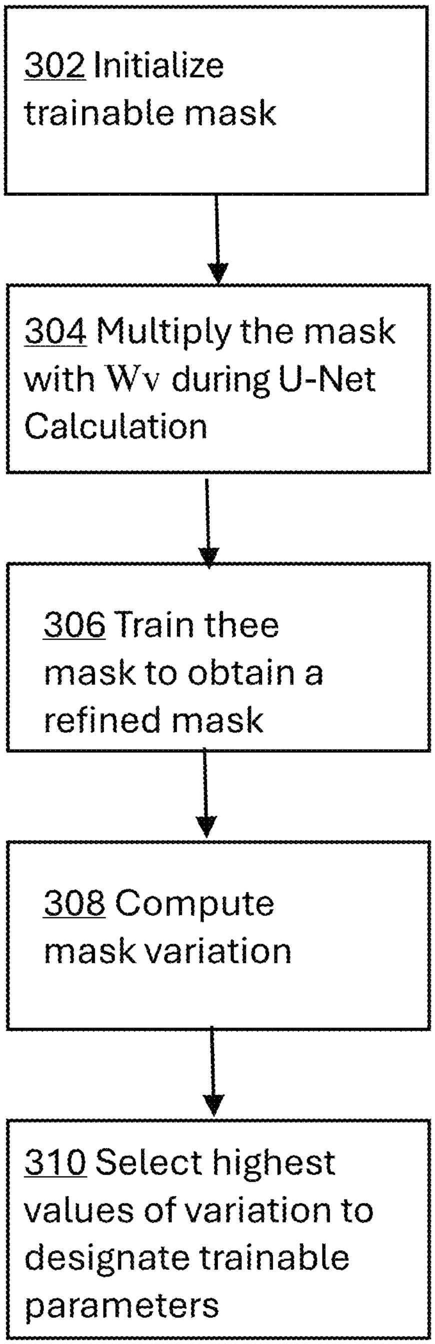
FIG. 3 is a flowchart of an example of the selection step of FIG. 1 in accordance with disclosed implementations.

The pivotal parameters method referred to above, selects the pivotal parameters of $W_V$ in self-attention layers for optimization, to thereby reduce the problem of overfitting. FIG. 3 illustrates an example of step 108 (pivotal parameters selection) of FIG. 1. In step 302 a trainable mask $M_V$, which has the same shape as $W_V$ in the self-attention block, is initialized. In step 304, the trainable mask is then element-wise multiplied with $W_V$ during the calculation for the whole U-Net, making the mask $M_V$ trainable through the U-Net forward and backward process. Subsequently, in step 306, $M_V$ is trained using the objective, $$\min_{M_V} \mathbb{E}_{t,x,\epsilon,V^*}\left[\left\|\epsilon_t - \epsilon_{\{\theta,M_V\}}(x_t, t, concat(V^*, y))\right\|_2^2\right], \tag{8}$$

where the network parameters e and the concept identifier token V* are fixed during training.

After several epochs of training the mask $M_V$, a refined mask $M_V$ is obtained at step 306. The mask variation is then computed as $\Delta_M=|M_V-M_V|$. For each parameter in $W_V$, with $\Delta_M$ representing the variation. At step 310 the top P % of positions with the highest values in $\Delta_M$ are selected and designated as parameters in $W_V$ that are pivotal parameters which will be optimized. P is selected in a manner that balances the trade-offs between overfitting and underfitting to thereby optimal model performance. An example of the selection of P is set forth in detail below. These pivotal parameters, along with $W_K$ and $W_V$ from the cross-attention layers, form the trainable parameter set $\theta_T$. The remaining parameters are treated as non-trainable parameters, denoted $\theta_N$. The final training loss is defined as:

$$\min_{\theta_T,V^*} \mathbb{E}_{t,x,\epsilon,V^*}\left[\left\|\epsilon_t - \epsilon_{\{\theta_T,\theta_N\}}(x_t, t, concat(V^*, y))\right\|_2^2\right]. \tag{9}$$

Figure 4B:
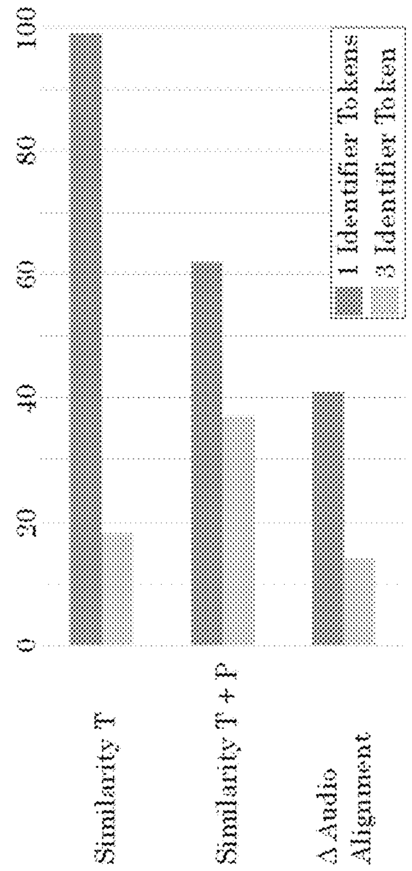
FIG. 4*b* illustrates similarity metrics of single and multiple token data sets that represent musical concepts.
Figure 4A:
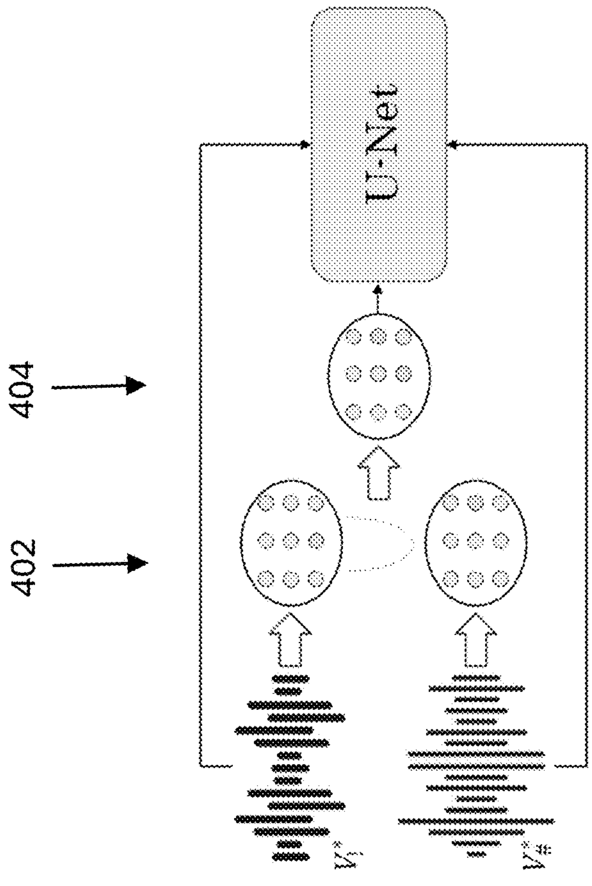
FIG. 4*a* is a schematic illustration of the merger of concept data structures in accordance with disclosed implementations.

As noted above, more than one musical concept can be integrated into the model. FIGS. 4*a* and 4*b* schematically illustrates how multiple concepts are managed. As shown in FIG. 4*a*, given two concepts, the masks for these two concepts are learned individually (402) and merged as a new mask (404) for these two concepts. Then the training datasets of two concepts are combined and used to train the U-Net with the merged mask and the training dataset. $V^*_1$ and $V^*_2$ represent these two concepts, respectively. As shown in FIG. 4*b*, comparison of single concept identifier token and multiple concept identifier tokens can be accomplished from three different aspects, including the cosine similarity between the two learned concept identifier tokens after processing through the text encoder using only $V^*_1$ and $V^*_2$ as an input prompt (Similarity T), or using additional rich description as '$V^*_1$, Description' and '$V^*_2$, Description' (Similarity T+P). Higher similarity means greater difficulty in distinguishing between two concepts. Also shown in FIG. 4*b* are the discrepancy of two concepts as an Audio Alignment Score (ΔAudio Alignment). The ability to distinguish between concepts is discussed in greater detail below.

As discussed above with respect to FIG. 4*a*, to integrate multiple concepts, the mask for each concept is learned individually and the binary masks are merged as a new mask to determine pivotal parameters for tuning. Then, the training datasets for each concept are combined and pivotal parameters are optimized on the merged datasets. To distinguish each concept, different concept identifier tokens are used to represent different concepts, e.g., $V^*_i$, and optimize them along with pivotal $W_V$ parameters in self-attention and $W_K$ and $W_V$ in cross-attention layers.

In joint training involving multiple concepts, it is essential that the learned concept identifier tokens, denoted as $V^*_i$ for different concepts, are distinct from each other (to avoid one concept subsuming the other concept). However, using a single concept identifier token for each concept often results in tokens becoming similar after processing through the text encoder. FIG. 4*b* compares the outcomes of using one concept identifier token versus multiple concept identifier tokens for each concept (as indicated by the shading in the key of FIG. 4*b*). For simplicity, this discussion focuses on just two concepts. However, it will be apparent to one of skill in the art that the disclosure mechanisms can be extended to any number of concepts.

As an example, initially, cosine similarity of two learned concept identifier tokens (after processing through the text encoder) were examined when only $V^*_1$ and $V^*_2$ are utilized as prompts for music generation. This approach results in a similarity exceeding 99%, rendering it challenging to differentiate between the two concepts under these conditions. To address this limitation, the input text prompts can be augmented with more musical description (T+P), changing it to '$V^*_1$, Description' and '$V^*_2$, Description'. This modification reduces the similarity score, but it is still above 60%, as shown in FIG. 4*b*.

These similarity scores are indicative of the discriminative capacity of the concept identifier tokens, a crucial factor for generating optimal music that incorporates multiple concepts. When the similarity score is high, $V^*_1$ and $V^*_2$ are likely to converge on the same concept, leading the model to generate music that predominantly reflects one concept while neglecting the other. The ΔAudio Alignment Score (discussed in greater detail below) further substantiates this, showing a significant discrepancy in Audio Alignment Scores between the two concepts when only a single concept identifier token is used for each concept. Higher ΔAudio Alignment indicates the model is more likely to generate only one concept rather than the simultaneous generation of the two concepts as we expect.

Based on this experiment, the number of concept identifier tokens for each concept was increased, according to the following reasons:

(1) Richer Representation: More tokens per concept lead to a richer, more distinct representation, reducing the risk of similarity for different concepts.

(2) Minimized Overlap: Increasing the number of available tokens helps decrease overlap in the conceptual space, especially important for closely related concepts.

(3) Adaptive Flexibility: A higher count of tokens allows the model to better adapt to the complexities and variations of musical concepts, enhancing its ability to differentiate subtle nuances.

This concept enhancement strategy significantly improves the model's discriminative ability for multiple concepts, ensuring a more accurate representation in complex musical compositions. Applying the proposed strategy leads to a reduction in all key similarity metrics presented in FIG. 4*b*. This decline in metrics is indicative of the enhanced discriminative ability of a model in accordance with disclosed implementations when handling multiple concepts.

To facilitate music generation in accordance with disclosed implementations, a new benchmark, which includes both the dataset and the evaluation protocol, has been established. This benchmark is discussed in greater detail below. A benchmark of 20 distinct concepts, including a balanced collection of 10 musical instruments and 10 genres, such as Erhu, Kora, Muzak, Urban, etc. . . . , was collected. The audio samples for this dataset were sourced from various online platforms. For each concept, a two-minute audio segment was used to form the concept data training set, supplemented by an additional one-minute audio segment that serves as the evaluation (test) set. Also, 20 prompts from were collected from the MusicCaps data set. The MusicCaps dataset is publicly available and contains 5,521 music examples, each of which is labelled with an English aspect list and a free text caption written by musicians. The 20 prompts were specifically chosen for their diversity in content and style.

These prompts were utilized to evaluate the versatility and robustness across various musical themes. For evaluation, 50 audio clips were generated for each concept and prompt, resulting in a total of 20,000 clips. This extensive compilation enabled a thorough assessment of method performance and generalization capabilities. Evaluation Metrics. We evaluate our method based on three metrics, the first two of which are similar to those proposed in Gal.

The Audio Alignment Score, which measures the similarity between the generated audio and the target concept, demonstrates the model's ability to learn new concepts from the reference music. Specifically, the method disclosed in Clap Learning Audio Concepts From Natural Language Supervision, Authored by Benjamin Elizalde, Soham Deshmukh, Mahmoud Al Ismail, and Huaming Wang (referred to as "CLAP" herein) was utilized to calculate the CLAP space features. The cosine similarity between features from the generated audio and the target concept is calculated to determine the Audio Alignment Score. In the context of multi-concept generation, the audio alignment for each target concept within the generated audio was computed separately. The mean of these values was then taken as the final Audio Alignment Score.

The Text Alignment Score evaluates the ability of methods to generate target concepts that are aligned with corresponding textual prompts. For this purpose, audio segments were generated using a diverse array of prompts, varying in content, style, and theme. Subsequently, the average CLAP-space feature of these generated audio segments was calculated. The Text Alignment Score was then determined by calculating the cosine similarity between this average CLAP-space feature and the CLAP-space features of the textual prompts without the concept identifier token V*.

The ΔAudio Alignment score is utilized only in the context of multiple-concept learning to evaluate the model tendency. In the multiple-concept learning, the ΔAudio Alignment score is the discrepancy between the Audio Alignment Score for each target concept. Higher ΔAudio Alignment indicates the model is more likely to generate only one concept rather than the simultaneous generation of the two concepts as we expect. Our ultimate objective is to distinctly learn different concepts for multiple concepts. Therefore, a model achieving a lower ΔAudio Alignment score is considered more effective in this regard.

Audio Alignment Score and Text Alignment Score are used in both single-concept learning and multiple-concept learning. While ΔAudio Alignment score is only used in multiple-concept learning.

Example of the disclosed implementations utilize a well-known JEN-1 model as the pretrained model. The textual condition features were extracted by FLAN-T5 before sending into the U-Net model. FLAN-T5 is an open-source, sequence-to-sequence, large language model that was published by Google researchers in 2022, All experiments were conducted using an A6000 GPU and Pytorch framework. Before network training, 100 epochs were initially dedicated to training the mask for Pivotal Parameters selection. For the training process, the model was configured with a batch size of 32, and a learning rate of 1e-5 for U-Net parameters and 1e-4 for learnable concept identifier tokens, respectively. The model was trained for 1,500 steps with AdamW optimizer for both single and multiple concepts. AdamW optimization is a known stochastic gradient descent method that is based on adaptive estimation of first-order and second-order moments with an added method to decay weights. The number of concept identifier tokens was set to 3 without further declaration. For a fair comparison, 200 steps of classifier-free guidance was used with a scale of 7 for all experiments during the music generation. Classifier-free guidance is a known method in which a conditional and an unconditional diffusion model are jointly trained and the resulting conditional and unconditional score estimates are combined to attain a trade-off between sample quality and diversity similar to that obtained using classifier guidance.

In disclosed embodiments, three distinct sets of parameters are trained: (1) all key and value projection parameters of cross-attention layers, (2) pivotal value projection parameters of self-attention layers, and (3) the learnable concept identifier token for new concepts. Building on this, three baseline models were generated for comparative analysis. The first baseline optimizes solely the learnable concept identifier tokens for new concepts, consistent with the methods used in Gal. The second baseline model diverges by keeping the tokens for new concepts fixed while fine-tuning all parameters in the diffusion model. In this example, each target concept is represented by a unique identifier, e.g., 'sks', a token infrequently used in the text token space and not adjusted during fine-tuning. In the third baseline, fine-tuning of the key and value projection parameters in the cross-attention layers of the U-Net were limited, introducing a new $V_*$ token for the new concept while keeping other parameters fixed, as in Kumari.

As demonstrated in Table 1 below, disclosed implementations outperform these baselines. Disclosed implementations exhibit advantageous performance with respect to the first baseline because a of the training of a broader variety of parameters, enhancing the model's ability to extract new concepts from the reference music. In contrast, training that focuses solely on concept identifier token proves insufficient for learning concepts from reference music. While such training might yield a higher Text Alignment Score, it often results in generated music that scarcely reflects the concept of the reference. This discrepancy leads to suboptimal results in the Audio Alignment Score.

TABLE 1

Quantitative comparisons (disclosed implementation achieve the best two-type alignment balance.

| | Tuned Parameters | Text Alignment | Audio Alignment |
|---|---|---|---|
| 1. Training Concept Identifier Token Only | 0.001M | 34.70 | 27.41 |
| 2. Training all Parameters in U-Net | 746.02M | 15.89 | 61.65 |
| 3. Training Cross-Attn KV and Concept Identifier Token | 25.56M | 26.60 | 23.30 |
| 4. Disclosed Implementations-Single Concept | 26.18M | 29.39 | 37.07 |
| 5. Disclosed Implementation-Double Concept | 26.81M | 22.24 | 44.73 |

While model 2 trains more parameters than models 4 and 5 (corresponding to disclosed implementations, it still significantly underperforms, illustrating that the generation ability of a model depends not only on the quantity (which would be expected) but also criticality with respect to the type of trained parameters. Specifically, training all parameters in the U-Net model can lead to substantial overfitting to the reference music, resulting in the text prompt losing the ability to control the generation. As shown in Table 1, Training All Parameters in U-Net gets the lowest score in Text Alignment.

Model 3, although it incorporates learnable concept identifier tokens and partial network parameter training, falls short of the performance of disclosed implementations. Training only KV in cross-attention layers is not enough to learn the concept from the reference music, leading to poor performance on Audio Alignment. This highlights the necessity of carefully balancing the number and types of trainable parameters to effectively learn new concepts without losing the prior knowledge of the pretrained model.

Experiments have been conducted to understand how different components affect the performance of the model. With a focus on the pivotal parameters selection, two key areas were examined. First, the influence of the ratio of training parameters on the final results was examined. Then, the selection method of the disclosed implementations was compared with random selection to show its effectiveness. For the integration of multiple concepts, the effect of using different numbers of concept identifier tokens was also studied. Results of this testing are presented below in Table 2.

TABLE 2

Ablation study on Training Parameter Ratio and Parameter Selection.

| Training Parameters Ratio (%) | Text Alignment ↑ | Audio Alignment ↑ |
|---|---|---|
| 1 | 29.39 | 37.06 |
| 5 | 26.01 | 39.91 |
| 10 | 24.11 | 42.23 |
| 50 | 19.43 | 46.10 |
| 100 | 18.67 | 46.68 |
| 5-random | 28.14 | 35.64 |

In the pivotal parameters approach disclosed herein, a selected subset of influential value projection parameters was trained from the self-attention layers. The selection ratio of P (described above) is varied from 1% to 100%, as shown in Table 2. Increasing the ratio will improves the Audio Alignment ability but deprecate the generalization ability of the model. The results indicate that a selection ratio of about 5% yields optimal performance. At this ratio, the model effectively balances the acquisition of new concepts with the preservation of previously learned knowledge. A comparison between the Pivotal Parameters selection and random selection, as shown in Table 2, (between '5' and '5-random') shows that training the parameters chosen through the Pivotal Parameters method brings the model superior fitting capabilities and results in a better Audio Alignment compared to training parameters that were selected randomly.

Table 3: Ablation study on Concept Identifier Token Number for single and multiple concepts. ΔAudio Alignment is the difference between the Audio Alignment Score of two concepts for multiple-concept learning.

| | Concept Identifier Tokens Number | | |
|---|---|---|---|
| | 1 | 3 | 5 |
| Text Alignment-Single ↑ | 25.87 | 26.17 | 26.01 |
| Audio Alignment-Single ↑ | 38.24 | 37.33 | 39.91 |
| Text Alignment-Multiple ↑ | 21.99 | 22.25 | 17.63 |
| Audio Alignment-Multiple ↑ | 42.55 | 44.73 | 44.43 |
| ΔAudio Alignment ↓ | 24.38 | 8.05 | 12.20 |

In Table 3, the model's performance in terms of text and audio alignment with varying numbers of concept identifier tokens is presented. In the context of single concept learning, variations in the number of concept identifier tokens show minimal impact on performance. However, in multiple-concept learning (two concepts in this example), despite similar Text and Audio Alignment when using either 1 or 3 concept identifier tokens, the ΔAudio Alignment of using 1 concept identifier token is much higher than that of using 3 concept identifier tokens. This suggests a strong bias toward one of the concepts, which is contrary to expectations for multiple concept learning. Consequently, 3 concept identifier tokens seems to ensure a balance between distinct concept learning and computational efficiency.

Disclosed implementations include a novel customized music generation task and a framework for this task. Learnable concept identifier tokens are used to represent the new concept and fine-tune the large-scale text-to-music diffusion model a pivotal parameters selection method is used to select parameters for optimization and only the selected parameters are optimized in the diffusion model, thereby balancing the learning of new concepts and maintaining prior training.

Disclosed implementations can execute on conventional computing devices and in conventional environments that are well known in the art of machine learning. For example, High-Performance Computing (HPC) Clusters, which consist of interconnected servers or nodes with powerful CPUs, GPUs, and high-speed interconnects can be used. These clusters are commonly used for large-scale parallel processing and training deep learning models. GPUs are specialized hardware accelerators designed for parallel computation. They excel at matrix operations, which are fundamental in neural network training. Deep learning frameworks like TensorFlow and PyTorch automatically utilize GPUs to speed up model training. Cloud Computing Platforms, such as AMAZON WEB SERVICES™ (AWS), GOOGLE CLOUD™, and MICROSOFT AZURE™ offer GPU instances and managed services for machine learning can be used in accordance with the disclosed implementations. Further, "edge devices", including smartphones, embedded systems, and IoT devices, increasingly run machine learning models locally by leveraging optimized frameworks like TENSORFLOW LITE™ and ONNX™. Various distributed systems can be used in connection with disclosed implementations. Of course, the choice of environment depends on factors like model complexity, data size, available resources, and deployment requirements. Each environment has its trade-offs, and practitioners of skill in the art will be able to select the most suitable environment based on their specific use case and the disclosure herein.

All functions disclosed herein can be implemented as "modules" of computer readable code stored on non-transitory media and executed by one or more computer hardware processors. The above-described embodiments and implementations are intended to be examples only. Alterations, modifications, and variations may be affected to the particular embodiments by those of skill in the art without departing from the scope of the invention, which is defined by the claims appended hereto.

What is claimed:

1. A computer-implemented method for configuring a pretrained text to music artificial intelligence (AI) model that includes a neural network implementing a diffusion model, the method comprising:

receiving audio sample data corresponding to a specific audio concept;

generating at least one concept identifier token based on the audio sample data, wherein the at least one concept identifier token represents unique characteristics of the audio sample data;

adapting a loss function of the diffusion model based on the at least one concept identifier token;

selecting pivotal parameters in weight matrices in a self-attention layer of the neural network of the AI model based on the audio sample data; and further training the pivotal parameters of the AI model, to thereby optimize the AI model for the specific audio concept, whereby the diffusion model is able to generate music corresponding to the specific audio concept.

2. The method of claim 1, wherein the specific audio concept is the style of a specified artist.

3. The method of claim 1, wherein the specific audio concept is the sound of a specified musical instrument.

4. The method of claim 1, wherein the step of selecting pivotal parameters comprises:

initializing a trainable mask which has the same shape as the self-attention layer;

elementwise multiplying the trainable mask with parameters of the self-attention layer during calculation for the neural network to derive a refined mask form the trainable mask; and selecting, as the pivotal parameters, subset of the parameters having a high variation between the trainable mask and the refined mask.

5. The method of claim 4, wherein the subset comprises a predetermined percentage of the parameters.

6. The method of claim 4, wherein the subset comprises a predetermined number of the parameters.

7. The method of claim 1, wherein the at least one concept identifier token comprises two or more concept identifier tokens.

8. The method of claim 1, wherein further training the pivotal parameters of the AI model, to thereby optimize the AI model for the specific audio concept comprises training only the pivotal parameters.

9. The method of claim 1, wherein the specific concept is at least one of a music genre, an artist's style, and a musical instrument.

10. A computer system for configuring a pretrained text to music artificial intelligence (AI) model that includes a neural network implementing a diffusion model, the method comprising:

at least one computer hardware processor; and at least one memory operatively couple to the at least one computer hardware and having computer executable instructions stored therein which, when executed by the at least one computer processor, cause the at least one computer processor to carry out a method comprising:

receiving audio sample data corresponding to a specific audio concept;

generating at least one concept identifier token based on the audio sample data, wherein the at least one concept identifier token represents unique characteristics of the audio sample data;

adapting a loss function of the diffusion model based on the at least one concept identifier token;

selecting pivotal parameters in weight matrices in a self-attention layer of the neural network of the AI model based on the audio sample data; and further training the pivotal parameters of the AI model, to thereby optimize the AI model for the specific audio concept, whereby the diffusion model is able to generate music corresponding to the specific audio concept.

11. The system of claim 10, wherein the specific audio concept is the style of a specified artist.

12. The system of claim 10, wherein the specific audio concept is the sound of a specified musical instrument.

13. The method of claim 10, wherein the step of selecting pivotal parameters comprises:

initializing a trainable mask which has the same shape as the self-attention layer;

elementwise multiplying the trainable mask with parameters of the self-attention layer during calculation for the neural network to derive a refined mask form the trainable mask; and selecting, as the pivotal parameters, subset of the parameters having a high variation between the trainable mask and the refined mask.

14. The system of claim 13, wherein the subset comprises a predetermined percentage of the parameters.

15. The system of claim 13, wherein the subset comprises a predetermined number of the parameters.

16. The system of claim 10, wherein the at least one concept identifier token comprises two or more concept identifier tokens.

17. The system of claim 10, wherein further training the pivotal parameters of the AI model, to thereby optimize the AI model for the specific audio concept comprises training only the pivotal parameters.

18. The system of claim 10, wherein the specific concept is at least one of a music genre, an artist's style, and a musical instrument.

* * * * *